United States Patent [19]

Marchetto

[11] Patent Number: 5,749,592
[45] Date of Patent: May 12, 1998

[54] TOWING DEVICE FOR TWO-OR THREE-WHEEL VEHICLES

[76] Inventor: Carlo Marchetto, via Postale Vecchia, 19-36070 Trissino (VI), Italy

[21] Appl. No.: 545,861

[22] PCT Filed: May 13, 1994

[86] PCT No.: PCT/EP94/01543

§ 371 Date: Nov. 13, 1995

§ 102(e) Date: Nov. 13, 1995

[87] PCT Pub. No.: WO94/26580

PCT Pub. Date: Nov. 24, 1994

[30] Foreign Application Priority Data

May 14, 1993 [IT] Italy ................... VI93A0080
Oct. 1, 1993 [IT] Italy ................... VI93A0154

[51] Int. Cl.$^6$ ................................ B62K 13/02
[52] U.S. Cl. .................. 280/292; 280/204; 403/349
[58] Field of Search .................... 280/204, 231, 280/288.4, 292, 400, 492, 493, 495, 504; 403/348, 349

[56] References Cited

U.S. PATENT DOCUMENTS 1,855,172  4/1932  Hess ........................ 280/293
2,317,729  4/1943  Bruno ..................... 403/348 X
4,619,549  10/1986  Gilbreth .................... 403/349

FOREIGN PATENT DOCUMENTS 0 008 982 A1  8/1979  France .
3739515 A1  11/1987  Germany .
16828  7/1902  United Kingdom ............ 280/204
2 168 936  7/1986  United Kingdom .
WO 92/03329  3/1992  WIPO .

*Primary Examiner*—Kevin Hurley
*Attorney, Agent, or Firm*—Watson Cole Stevens Davis P.L.L.C.

[57] ABSTRACT

A bicycle towing device in which a plurality of aligned rigid bars are connected by means of a coupling so that one bar can rotate with respect to the other along the alignment axis of the bars. Hub and pin arrangements are connectable to the free ends of the bars and have axes of rotation perpendicular to the alignment axis of the rods. The hub and pin arrangements are connectable to the respective vehicles to allow one vehicle to move with respect to the other while being towed.

7 Claims, 2 Drawing Sheets

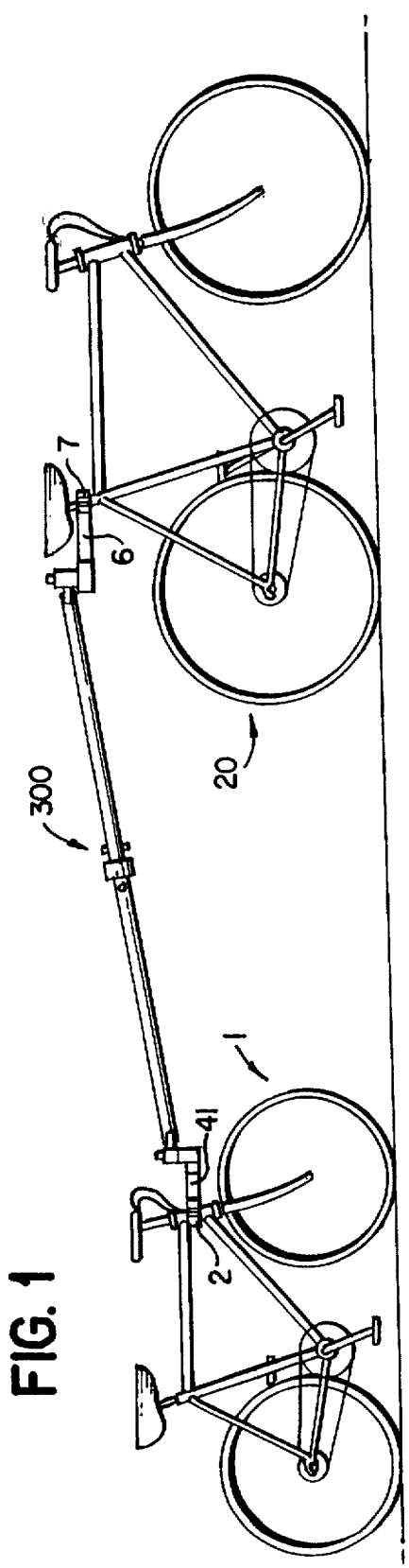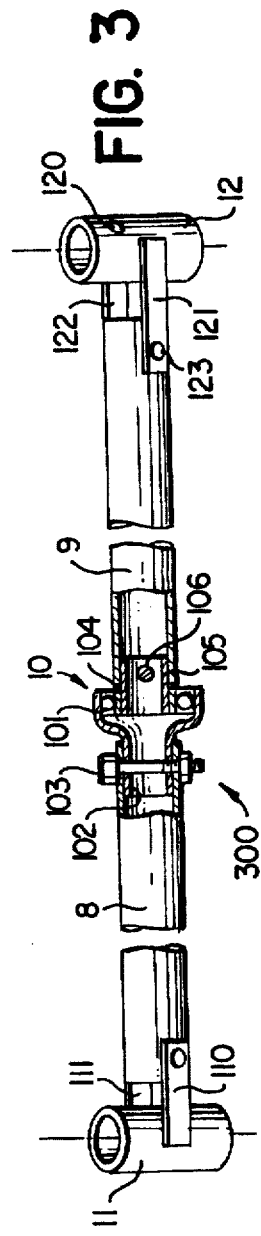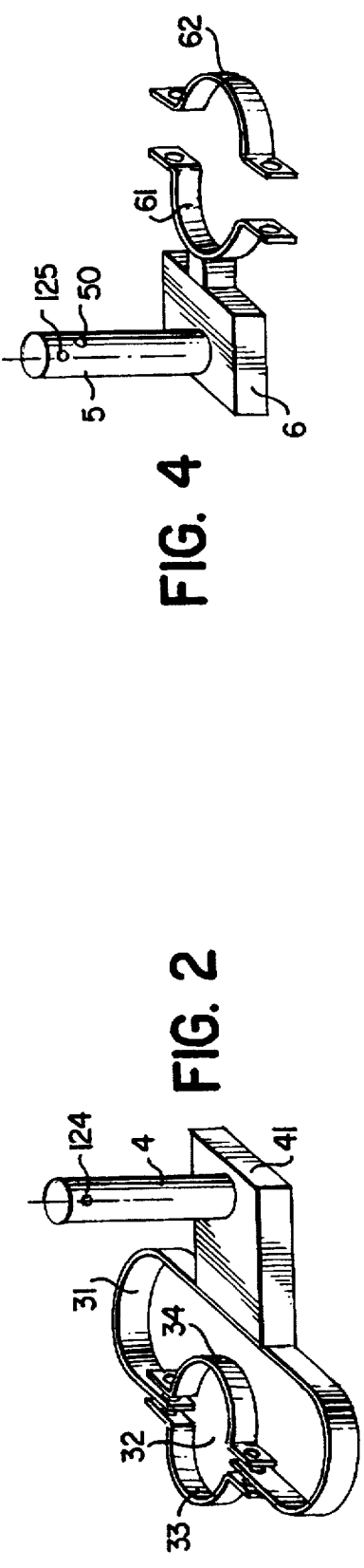

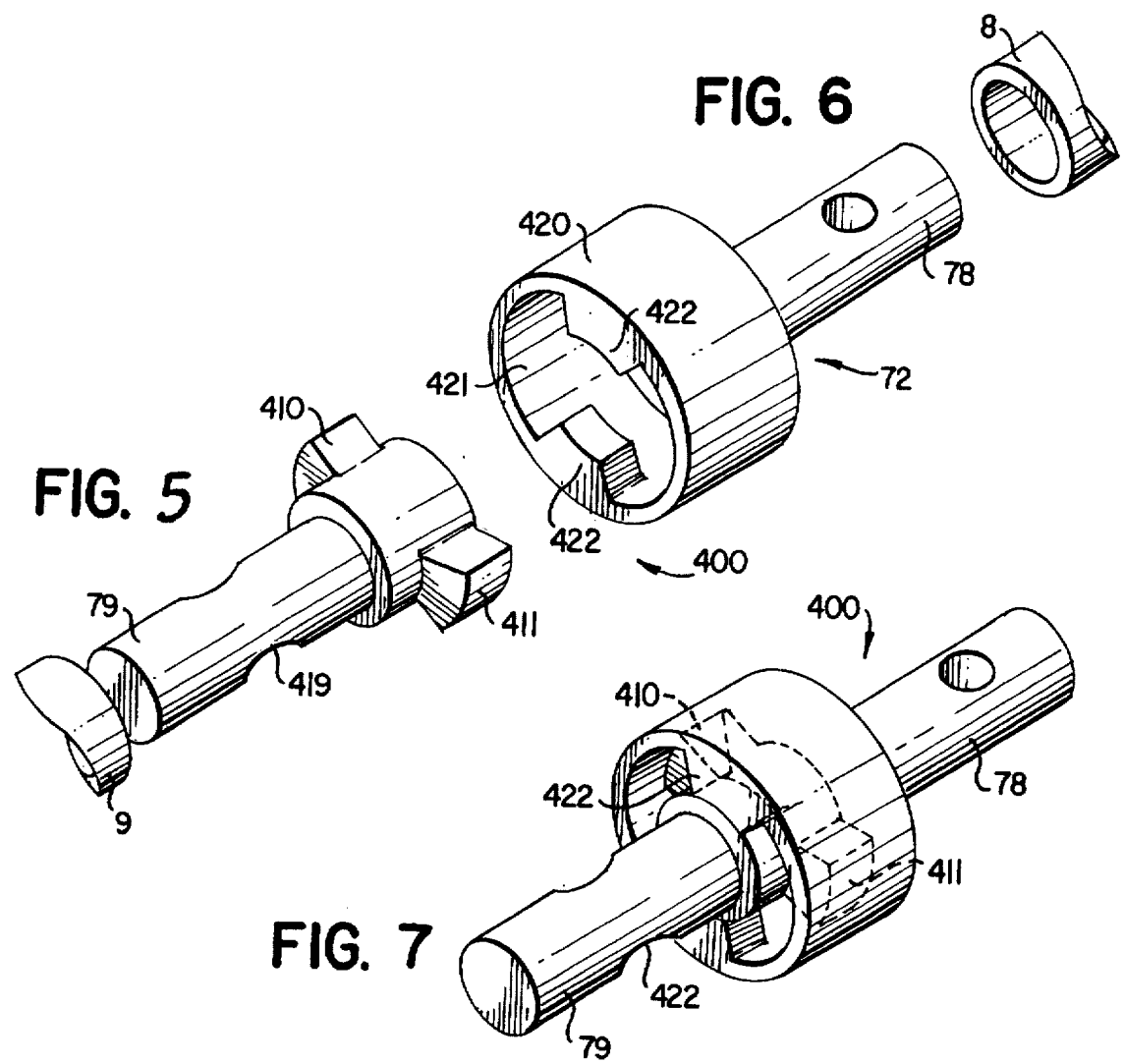

TOWING DEVICE FOR TWO-OR THREE-WHEEL VEHICLES

BACKGROUND OF THE INVENTION

The invention is a towing device for two- or three-wheel vehicles, with or without an engine.

The known technique includes towing devices that are particularly suitable for being connected with motor vehicles in order to tow cars with engine troubles, caravans or trucks. Said towing devices generally consist of a sort of rudder that is integral with the vehicle to be towed and couples with the towing vehicle by means of a joint connection. The joints are generally such as to make the rotation on two or more axes possible.

The above mentioned towing systems are mainly suitable for operating according to an arrangement of the towed rudder parallel to the roadway, but they cannot stand considerable misalignments between the towed and the towing vehicle. Further, the applicant doesn't know of any towing device particularly suitable for two- or three-wheel vehicles, like for example a towing device for children's bicycles to be towed by adults with larger bicycles.

SUMMARY OF THE INVENTION

The aim of the invention is the implementation of a towing device particularly suitable for two- or three-wheel vehicles, which should be easily mounted and dismounted on/from both the towed and the towing vehicle.

In particular, the invention is aimed at carrying out a device in which the pins connecting the towing bar/s with the towed and the towing vehicle should be extremely easy to connect with said vehicles, without requiring the employ of particular equipment.

Another aim to be achieved is the implementation of a towing device provided with joints, in such a way as to make for the towing between two vehicles with the towing vehicle being larger than the towed one. All the above mentioned goals and other goals the will be better highlighted further on are achieved by means of a towing device for two- or three-wheel vehicles with or without engine, which, according with claim 1), comprises:

- two or more rigid bars, substantially aligned with one another and connected by means of at least one coupling articulation in such a way as to make for the rotation of one bar with respect to the other according to the alignment axis of said bars;
- hubs rotatingly connected with each of the two free ends of said bars, the axis of said hubs being perpendicular to the rotation axis of said hubs themselves and said rotation axis being perpendicular to the longitudinal axis of said bars;
- a first pin suitable for housing one of said hubs and housed by a support provided with elements that can be removed and connected with the frame of the towed vehicle;
- a second pin suitable for housing the other hub housed by a support connected with the rear part of the towing vehicle.

According to a practical application, the towing device that is the object of the invention comprises two contiguous bars connected with each other by means of a coupling articulation including a bearing, the outer ring of which is connected with the end of one of said bars and the inner ring of which is connected with the end of the other bar.

According to another application the device object of the invention consists of two contiguous bars connected with each other by means of a male coupling fixed at the end of one of said bars, which in turn couples with the inner part of a cavity belonging to a female coupling fixed to the end of the other bar. Said female coupling is provided with walls that develop peripherally along part of its perimeter in opposition against corresponding elements belonging to the male coupling, said elements being suitable for ensuring the uncoupling of the bars from each other when the rotation angle between the male and female coupling exceeds the maximum fixed value.

To advantage, according to this application, when the towing device inclines with respect to the vertical direction of a given angle considered dangerous, the uncoupling of the two bars connecting the vehicles takes place automatically.

BRIEF DESCRIPTION OF THE DRAWINGS

Further characteristics and details will be better highlighted in the description of two preferred embodiments of the invention given by way of explanation only, but which is not meant to limit the scope of the invention, such as it is illustrated in the enclosed tables of the drawings, where:

FIG. 1 shows two bicycles and the towing device that is the object of the invention;

FIG. 2 shows the pin belonging to the device object of the invention, suitable for being connected with the towed vehicle;

FIG. 3 shows two bars connected with each other, suitable for making up the towing device;

FIG. 4 shows the second pin suitable for being coupled with the bars shown in FIG. 3 and for being connected with the towing vehicle;

FIG. 5 shows the male coupling belonging to the device object of the invention;

FIG. 6 shows the female coupling belonging to the device object of the invention;

FIG. 7 shows the male coupling inserted in the female coupling before the relative rigid coupling has taken place;

FIG. 8 shows the male coupling connected with the female coupling.

DESCRIPTION OF THE INVENTION

With reference to the above mentioned figures, it can be noticed that the support 41 of the first pin 4, which will house the hub belonging to the rigid bars of the towing device, is fixed to the frame 2 of a bicycle, referred to as a whole by 1. Said support is provided with a ring 31 that is open in such a way as to make it possible to introduce the tube of the frame 2 inside the space 32, thus allowing the fixing of the support 41 to the frame 2 itself by means of the clamps 33 and 34, which are fastened around the ring 31 through appropriate bolts. The brake and the gearshift wires of the bicycle can thus pass through the inner space delimited by the ring, without interfering with the pin 4 of the towing device nor with the towing device itself.

As shown in FIG. 4, a pin 5 that will house the hub of the towing bars is similarly fixed to the column 7 of the saddle or to the frame that contains it of the towing vehicle 20. Said pin has a support 6 with a clamp-shaped projection 61 that joins with a similar clamp 62, so that the two clamps 61 and 62 can be fastened to each other in such a way as to enclose the column 7 shown in FIG. 1.

In the case represented in FIG. 3 the towing bars are two and are referred to by the numbers 8 and 9. They are connected with each other by means of a coupling articulation 300 including a bearing 10 that allows the rotation of one of the two bars, 8 or 9, with respect to the other in the direction defined by the longitudinal axis of the bars themselves.

It can be observed in detail that the bearing 10 is provided with a tubular projection 102 on the outer ring 101, the diameter of said projection being such as to make it possible to introduce it into the pipe 8. A bolt 103 ensures the connection between the pipe 8 and the tubular projection 103 that is fixed, for example through welding, to the outer ring of the bearing 101. Similarly, the inner ring 104 of the bearing is rigidly connected with a cut piece of pipe 105 and said piece of pipe is introduced inside the tubular bar 9 and is coupled with it by means of a bolt passing through a hole 106.

It is obvious that with this connection the tubular bars 8 and 9 are connected with each other so that the only allowed movement is the rotation of one bar with respect to the other, according to their common longitudinal axis.

At the end of each bar there are the hubs that will couple with the pins 4 and 5.

In particular, at the end of the bar 8 there is the hub 11 that is connected with said end by means of two bars 110 and 111 coupling with the end of the pipe with a rotary movement and by means of a pin, the axis of which is perpendicular to the axis of the pipe 8 and to the axis of the hub 11.

Similarly, as far as the bar 9 is concerned, it can be observed that at its end there is a hub 12 connected with two bars 121 and 122 by means of a pin housed in the hole 123, the axis of which is perpendicular both to the axis of the bar 9 and to the axis of the hub 12.

To advantage, each pin 4 and 5 can be provided at its end with a transversal hole, as shown in 124 and 125, respectively, in such a way as to allow the introduction in said holes of contrasting elements like split pins or deformable mechanical elements that prevent the accidental release of the hub from the pin.

Further, the pin 5 of the towing vehicle and the corresponding hub 12 that couples with it can be locked in their mutual rotation by means of a plug housed in the corresponding holes 50 and 120. The locking of the rotation of the hub 12 on the pin of the towing vehicle forces the towed vehicle, when necessary, to follow the towing vehicle in its direction, with no possibility for the towed vehicle to oscillate or move side by side with the towing vehicle. This is particularly useful when towing children's bicycles in busy roads and in downhills.

FIGS. 5, 6, 7, 8 show a variant of the device particularly suitable for ensuring the uncoupling of the bars that connect the two vehicles when one of the two bars inclines his male end or female end, with respect to the other, of an angle exceeding a given value considered as danger threshold.

It can be observed that in this variant the coupling articulation, referred to as a whole by 400, consists of a male coupling 71 and a female coupling 72, which can be removed and which couple with each other. The male coupling 71 is provided with two elements 410 and 411 that are symmetrical and are positioned along an axis perpendicular to the axis of the pin 79, which is connected with the bar 9 by means of a coupling device that gets into the hole 419. In the case shown in FIG. 5 the shape of said elements 410 and 411 is that of the sector of a circle. The female coupling 72 is provided with a drum 420 integral with the pin 78 that couples with the bar 8 by means of a coupling device that gets into the hole 418, the drum 420 and the bar 8 being coaxial. The drum 420 is provided with a cavity 421 partially closed outwards by two walls 422 equal to each other, said walls having the shape of the sector of a circle, too. These walls have reduced thickness, so that the male coupling 71, when it gets into the cavity 421, can freely rotate and face the internal contacting elements of the walls 422 with the surfaces of the elements 410 and 411. The FIGS. 5, 6 and 7 show clearly that when the male coupling has the symmetry axis of the elements 410 and 411 coinciding with the symmetry axis of the cavity 421, it can be inserted as shown in FIG. 7.

After a rotation of about 90° of the male coupling 71 with respect to the female coupling 72, as shown in FIG. 8, the two parts of the coupling are fixedly connected, which corresponds to the travelling position, when a vehicle tows the other.

If one of the two vehicles, either the towing or the towed vehicle, is subject, for any reason, to a deviation with respect to its vertical attitude, one of the two bars, 8 or 9, rotates with respect to the other.

When the rotation angle exceeds a given value, the male element is freed from the walls 422 and the uncoupling of the male and female element and therefore of the two bars takes place.

The towing device thus ensures its safe operation, since in dangerous situations the towed vehicle can uncouple from the other.

Experimental data have made it possible to ascertain that with a rotation of one bar with respect to the other ranging from 40° to 60° the uncoupling of the male and female elements takes place safely. The uncoupling angle may be adjusted by varying the sector size of the walls 442 or the sector size of the elements 410 and 411 so that rotation of one with respect to the other by between 40° and 60° will release or uncouple the respective male and female coupling 71 and 72.

Another important aspect to be taken in consideration is that the bar of the towed vehicle must be shorter than the distance from the ground of the hub of the towed vehicle. This way, in case of uncoupling of the vehicles, it is possible to prevent the bar of the towed vehicle from directing towards the ground and consequently causing the overturning of the towed vehicle.

The above description shows that as first thing the towing device that is the object of the invention makes towing possible between two vehicles, for example bicycles or motorcycles, with coupling points at different heights, with no problems regarding towing or balance for the persons who tow or who are towed. In fact, the articulation on the pins 11 and 12 allows a considerable difference in height of the two points of insertion of the hubs into the two pins, with no risk of dangerous situations.

Further, it can be pointed out also that the towed vehicle, for example a child's bicycle, can easily move even if the two bicycles are inclined with respect to the vertical plane, since the rotation between the bars 8 and 9 ensures this degree of freedom.

Besides, the rotation of the bars with respect to the pins makes for great freedom of movement and it is also possible for the towed vehicle to move side by side with the towing vehicle, when this freedom of movement is not hindered by the plug locking the rotation of the hub 12 on the pin 5.

The device object of the invention, in the practical application in which the coupling articulation consists of two male-female couplings, is also extremely safe, since it ensures the mutual uncoupling of the vehicles when one of them changes its attitude owing to a deviation, with respect to the vertical plane, of an angle exceeding a given maximum value considered as danger threshold.

The towing device object of the invention can be used also for towing motorcycles, for example motorcycles with mechanical failures, which cannot be moved by pushing due to their considerable weight.

The two bars, when disconnected, can be attached in removable way to the sides of the frame of the bycicle tube carried with the bycicle.

The stiffness of the towing device, ensured by the inextensibility of the two bars 8 and 9, makes for safe conditions during the towing, which wouldn't be possible if ropes or elastic devices were used.

I claim:

1. A towing device for vehicle comprising:

at least two rigid bars;

a coupler for connecting the two bars in substantially coaxial alignment, said bars being rotatable one with respect to the other along an alignment axis, said at least two rigid bars having free ends disposed distally from the coupler;

a connector for each free end of the rigid bars, said connector being rotatably coupled with the free end about a first rotation axis perpendicular to the alignment axis, said connector for connection to the vehicle on a second rotation axis perpendicular to the first rotation axis and the alignment axis, said connector including a pin and a hub sleevable on the pin, at least one of the pin and hub being connectable to the vehicle;

said coupler including a male portion having sectors extending radially outwardly from the alignment axis and female portion having recesses extending radially outwardly from the alignment axis for mating relationship with the sectors, said male and female portions including confronting surfaces of the respective sectors and recesses for engaging each other and securing the coupler together, said male and female portions being rotatable for decoupling the coupler.

2. A towing device according to claim 1, wherein said coupler includes a bearing having an outer ring connected with an end of one of said bars and an inner ring connected with an end of the other bar.

3. A towing device according to claim 1, further comprising a support for the pin in the form of a ring including a pair of stirrups removably engaging the vehicle.

4. A towing device according to claim 1, wherein the pins have transversal holes for receiving an element suitable for securing the hub with the corresponding pin.

5. A towing device according to claim 4, wherein said pin locks rotation of said hub with respect to said pin.

6. A towing device according to claim 1, wherein the male and female portions of the coupler are sized for releasing the coupler through a rotation of about 40°–60° of one bar with respect to the other.

7. A towing device according to claim 1, wherein said coupler connects two bars, and the bar connected with the towed vehicle is shorter than a distance from the ground to the coupler.

* * * * *